Patented Apr. 23, 1935

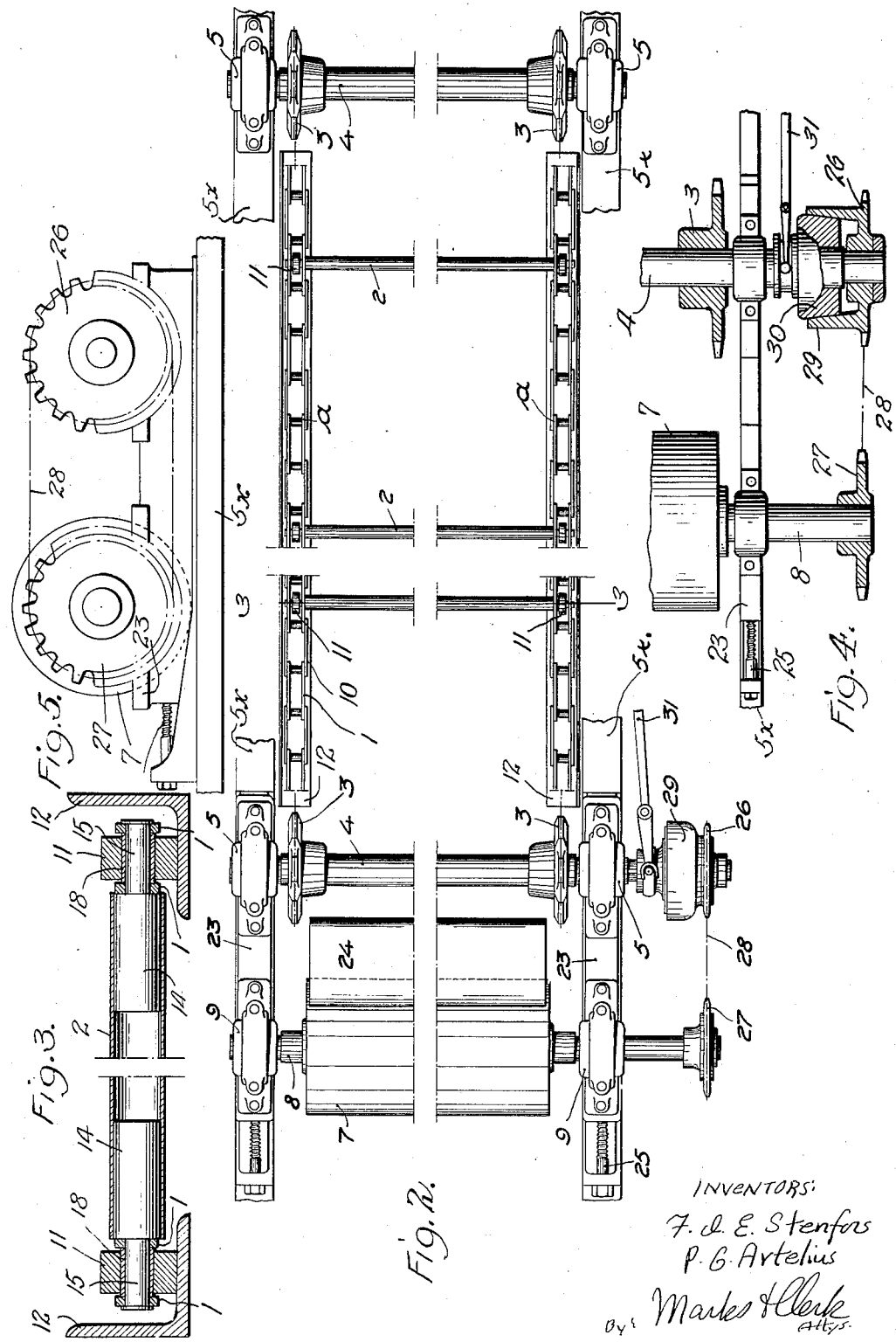

1,999,066

UNITED STATES PATENT OFFICE 1,999,066

CONVEYER FOR DRYING PLANTS

Frans Ivar Eugen Stenfors, Fredriksberg, Sundsvall, and Per Gunnar Artelius, Nockeby, Sweden, assignors to Aktiebolaget Svenska Fläktfabriken, Stockholm, Sweden Application March 24, 1932, Serial No. 600,980
In Sweden March 26, 1931

5 Claims. (Cl. 198—84)

This invention relates to improvements in conveying apparatus employed in drying plants for conducting a web of sheet material, such as paper, back and forth in a zig-zag path of travel through a drying chamber to expel moisture from the material. In such apparatus as ordinarily employed, a series of endless conveyers, mounted one above the other, operate to carry the web of material through the drying chamber. In the operation of the conveyers considerable trouble has been experienced in transferring or guiding the web from one conveyer to the other, particularly so, in the introduction of the web into the conveyers at the commencement of an operation. Owing to the nature of the sheet material, rupture of the web frequently occurs at the reversal of the web in its travel from one conveyer to the succeeding conveyer.

The present invention has for its object the provision of means for reversing the web as the latter passes from one conveyer to the other, whereby an abrupt change in the direction of the web is avoided and the strain is diminished, so that rupture of the web is lessened to a large extent. The means employed for the purpose is described in detail hereinafter, pointed out in the appended claims, and illustrated by the accompanying drawings.

In the accompanying drawings, in which similar reference characters designate corresponding parts:

Fig. 2 is a plan view of the second conveyer from the top, as shown by Figure 1;

Fig. 3 is a sectional view on the line 3—3 of Figure 2; and

Figs. 4 and 5 are detail views, respectively, showing a horizontal section and an end view of the mechanism for actuating the reversing roller for transmitting the web from one conveyer to the other.

Figure 1:
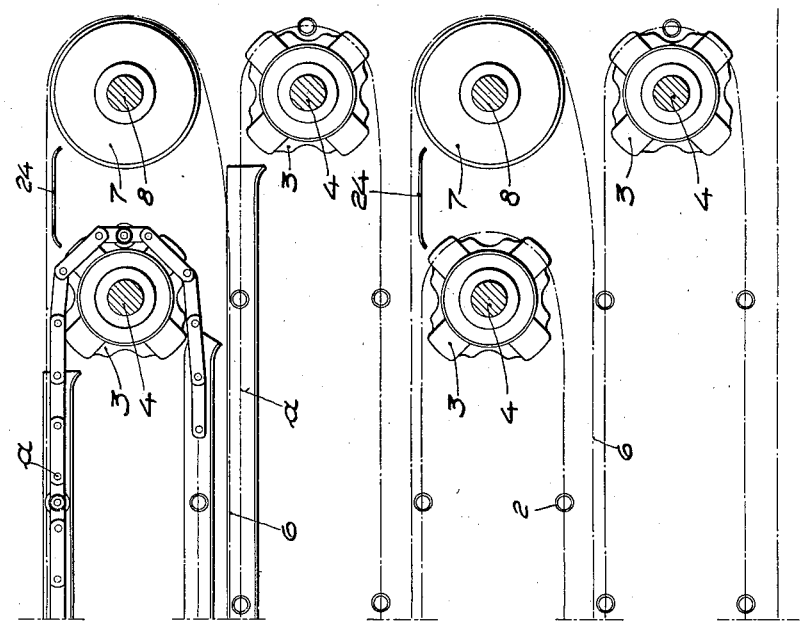
Figure 1 is a diagrammatic view, showing a side elevation of a conveying apparatus embodying the invention.
Figure 1:
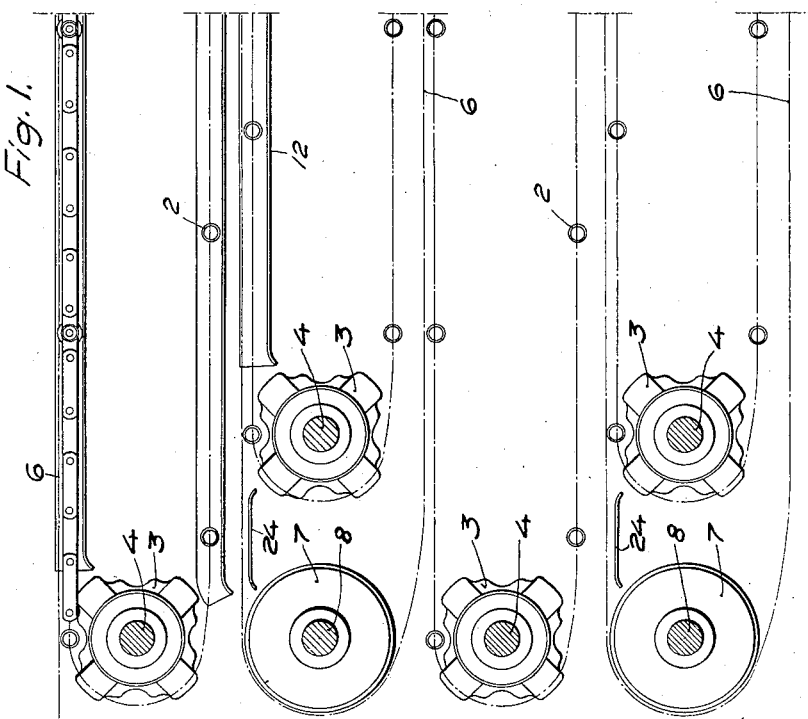

As shown in Figure 1, the apparatus comprises four horizontal endless conveyers of uniform structure, placed one above the other in assembled relation. Each conveyer consists of a belt formed of two opposite parallel endless chains *a* looped around sprocket wheels 3 fixed on shafts 4 journaled at their ends in bearings 5 mounted on opposite ends of the supporting frame 5*x*. Each endless chain is composed of link pairs 1 and 10 hinged together in the usual manner. Spaced at intervals along the endless chains are the web-supporting rods 2 extending transversely across the belt. The ends of each rod extend through opposite link pairs 1 and journaled on each rod end is a roller 11 between the members of the link pair. The rollers 11, moving in the upper flight of the belt carrying the load of the material being treated, travel along the guideways 12 extending longitudinally of the apparatus.

Referring to Fig. 3, each of the web-supporting rods 2 comprises a tubular main part, in the ends of which are seated the cylindrical heads 14 having spindles 15 projecting from their outer ends. These spindles form the ends of the rod and project through the link pairs 1 of the opposite endless chains. Fixed on each spindle is a bushing 18 between the members of the adjacent link pair. On the bushing is journaled the roller 11 between the members of the link pair to travel on the longitudinal guideway 12. The several rollers 11 travelling in the guideways 12 support the upper flight of the belt carrying the material during the operation of the apparatus.

As shown by the drawings (Fig. 1), the apparatus as a whole comprises four endless conveyers, but their number may be varied to meet different requirements. The several conveyers are of uniform structure and dimensions, and are mounted one above the other with their longitudinal axes extending in the same direction. The relative arrangement of the conveyers is such that each conveyer projects at one end beyond the corresponding end, or ends, of the adjacent conveyer, or conveyers; and the other end of the conveyer is inset from the corresponding end, or ends, of the adjacent conveyer, or conveyers. By well known means, not shown, the endless conveyers are alternately driven in opposite directions at a uniform rate of travel.

Opposite the inset end of each conveyer and extending above the projecting end of the conveyer immediately below, is the guide roller 7 parallel to the adjacent end of the conveyer. The roller is carried by the shaft 8 journaled in bearings mounted on the carriage 23 (Figs. 2, 4, 5) adjustable on the supporting frame of the apparatus by means of the set-screws 25. On the same carriage are mounted the bearings 5 of the shaft 4 at the adjacent end of the conveyer. By adjusting the carrier 23 longitudinally of the supporting frame the tension of endless chain belt can be regulated. The drive of the shaft 4 is transmitted to the shaft 8 by the sprocket wheels 26 and 27 mounted respectively on the shafts 4 and 8, the sprocket wheel 27 being fixed on the shaft 8. To control the drive from the shaft 4 to the sprocket wheel 26 a clutch is provided, comprising the members 29 and 30, actuated by the lever 31. By means of the clutch the guide roller can be connected with the drive of the adjacent conveyer. The driving connection is such that the peripheral speed of the roller is the same as the travel of the adjacent conveyer belt. Also the position of the roller is such with relation to the conveyer that the periphery of the roller is approximately tangential to the plane of the upper surface of the belt of the conveyer.

The principal function of the guide roller 7 is to reverse the travel of the web of material as the latter passes from a preceeding conveyer to the succeeding conveyer. The roller also serves to regulate the tension of the web, which is accomplished by adjusting the carriage 23. The guide rollers further aid in threading the web through the conveying apparatus at the beginning of an operation. The fore-end of the web is threaded through the apparatus by hand, and this manipulation of the web is facilitated by connecting the rollers with the drive of the machine, by means of the clutches 29—30. With the several guide rollers connected to the machine drive, the end of the web can be easily lead around the rotating rollers to the successive conveyers. After the web has been threaded through the machine the rollers are disconnected from the machine drive, but are rotated by the drag of the web drawn through the machine by the conveyers. When the rollers are in driving connection with the machines, their peripheral speed coincides with the travel of the conveyers. To facilitate the passage of the web between the conveyers and the reversing rollers, a bridge 24 is mounted between each roller and the end of the opposite conveyer. The web passes over the bridge and is prevented from dropping or sagging between the end of the conveyer and the roller.

What I claim is:

1. In apparatus for drying continuous sheet material, such as paper or the like, a series of endless conveyers for the sheet material placed one above the other in assembled relation with their longitudinal axes extending in the same direction, each of the upper conveyers of the series having one end projecting beyond the corresponding end of the conveyer immediately below and the upper conveyer also having its other end inset from the corresponding end of the conveyer immediately below, and a guide roller for the sheet material beyond the inset end of each conveyer and above the projecting end of the conveyer immediately below, said guide roller operating to reverse sheet material as the latter passes from one conveyer to the other.

2. In apparatus for drying continuous sheet material as claimed in claim 1, including means for rotating the guide rollers so that the peripheral speed of the rollers is approximately the same as the travel of the coacting endless conveyers.

3. In apparatus for drying continuous sheet material as claimed in claim 1, including clutch-controlled mechanism for transmitting the drive of each endless conveyer to the coacting guide roller to rotate the latter with a peripheral speed substantially the same as the travel of the coacting endless conveyer.

4. In apparatus for drying continuous sheet material as claimed in claim 1, including a carriage adjustably mounted on the frame of the machine opposite to the inset end of each conveyer, means for mounting the adjacent end of the conveyer and the guide roller on the carriage, and means for adjusting the carriage to regulate the tension of the conveyer and also the tension of the sheet material carried by the roller.

5. In apparatus for drying continuous sheet material, such as paper and the like, a series of endless conveyers placed one above the other so that each upper conveyer discharges the material at one end above the receiving end of the conveyer immediately below, and a guide roller mounted beyond the discharge end of each upper conveyer to reverse the direction of the material on to the receiving end of the conveyer immediately below, said guide roller having its periphery substantially tangential to the plane of the upper surface of the adjacent conveyer.

FRANS IVAR EUGEN STENFORS.
PER GUNNAR ARTELIUS.